March 12, 1946. W. E. PETTY 2,396,472
ANIMAL TRAP
Filed Aug. 3, 1943
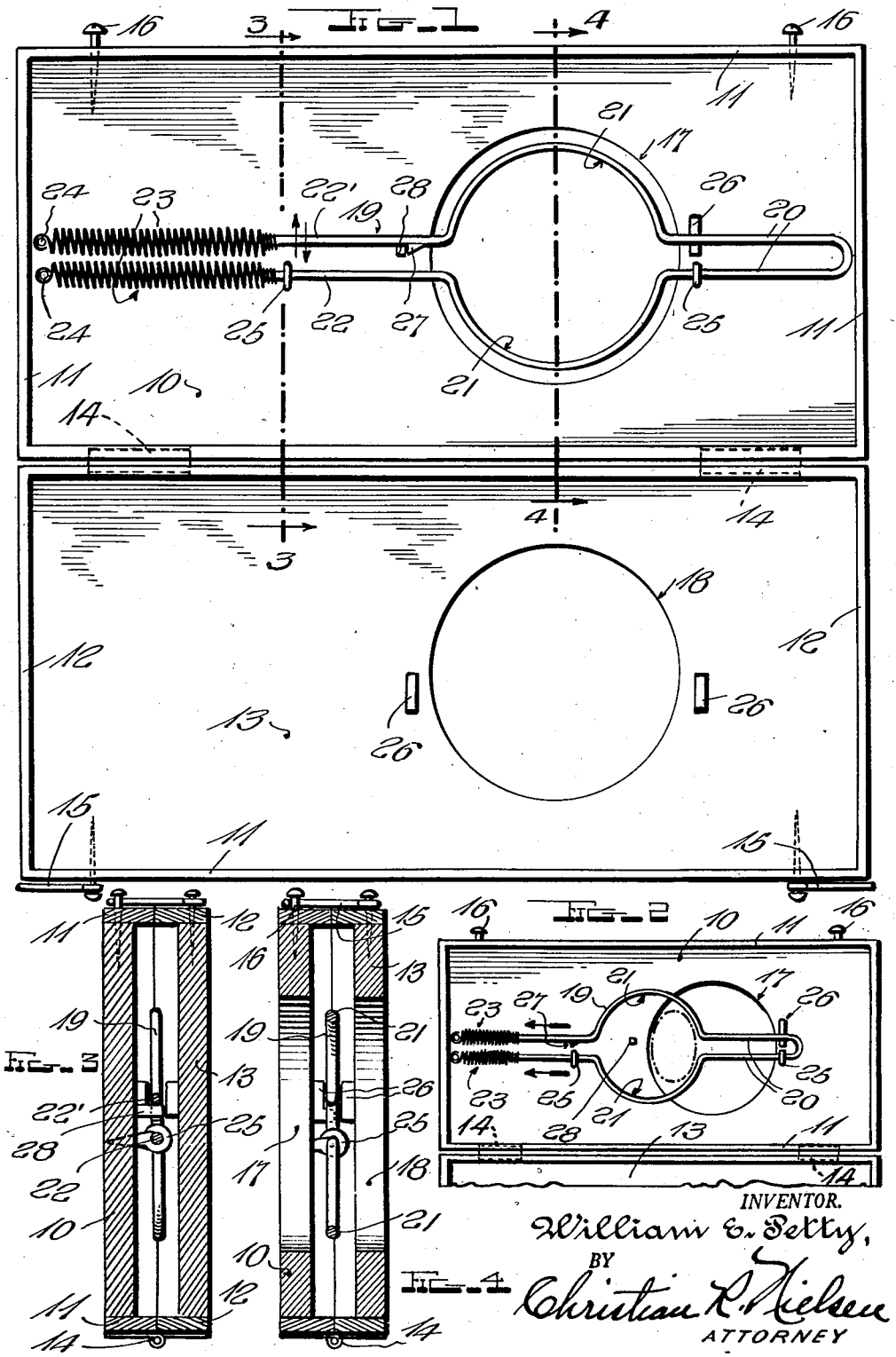
INVENTOR.
William E. Petty,
BY
Christian R. Nielsen
ATTORNEY Patented Mar. 12, 1946

2,396,472

UNITED STATES PATENT OFFICE 2,396,472

ANIMAL TRAP

William E. Petty, Altoona, Iowa

Application August 3, 1943, Serial No. 497,203

2 Claims. (Cl. 43—86)

The invention relates to animal traps, and especially to traps adapted to catching rats, ground-squirrels, mice and the like, adapted to be used in domestic establishments, hotels and the like, and also adapted to use out-of-doors in ways that will be readily understood from the following description. It is an especial aim of the invention to present a trap adapted to use at rat holes and the mouths of tunnels of mice and ground-squirrels, and may also be used for trapping other animals which have fixed entrances to their burrows or nests.

An important object of the invention is to present a trap adapted to be manufactured at a very low cost, from stock materials, and without requiring complicated production apparatus, or highly skilled labor or other high pay workers.

Another important object of the invention is to present a trap which may be readily manipulated by persons of limited experience and operated effectively by them.

A very important aim of the invention is to present a trap which is liable in a minimum degree to trapping of dogs or cats with any likelihood of death, and which is adapted to be set and operated with a minimum possibilty of injury to persons manipulating or using the traps.

It is also an important object to present a trap adapted to function with high efficiency, yet which will be liable in a minimum degree to derangement or injury incident to common uses of the trap, and which may be readily cleaned and maintained in effective operation.

Additional objects, advantages and features of invention reside in the construction, arrangement and combination of parts involved in the embodiment of the invention, as will be more readily understood from the following description and accompanying drawing, wherein, Figure 1 is a plan view of the trap opened and set.

Figure 2 is a similar view with the trap sprung,

Figure 3 is a cross section of the trap in closed position, on the line 3—3 of Figure 1, Figure 4 is a further cross section of the trap in closed position, on the line 4—4 of Figure 1.

There is illustrated a trap case consisting of a base board 10, of rectangular elongated form, to the edges of which there are attached side strips 11 which project from the inner face of the board a suitable distance for the purposes hereinafter indicated, and to form a continuous closure with opposed corresponding strips 12 on a cover board 13 of the same size as the board 10, and hinged thereto, at 14, so that the base board 10 and cover board 13 may be folded into close spaced and aligned relation, forming a space within which the trap mechanism is mounted and may operate. The base board may be of thicker material than the cover board 13, if desired, and the base and cover boards are held releasably in closed position by means of a pair of latch hooks 15 and pins 16.

Both the base board and cover board are formed with circular openings 17 and 18, respectively, both of the same size and arranged to be aligned with each other when the trap case is closed. These openings are located nearer one end of the trap case than the other, and are of a size approximately the same as an ordinary rat hole or the tunnel or nest entrance of the animal to be trapped. Longitudinally slidable in the space between the boards 10 and 13, there is a choker 19, formed of heavy wire, No. 9 wire having been found satisfactory for trapping rats and ground-squirrels. This choker is formed of a single piece of wire, bent midway of its length to form two closely spaced parallel arms 20, the length of which is nearly or quite equal to the diameter of the openings 17 and 18, and these openings are spaced from one end of the boards 10 and 13 a distance slightly less than the length of the arms 20. Just within the openings 17 and 18 when the trap is set, the intermediate portions of the wires are bent abruptly nearly or quite at right angles, and then in opposed semi-circles, concentric with the openings 17 and 18, forming in effect a circular opening or loop of somewhat less diameter than that of the openings 17 and 18. In the present instance, the radius of the opening between the semi-circular parts 21 is approximately one-quarter inch less than that of the openings 17 and 18. Inwardly of the semi-circular parts 21, the end portions of the wire are again extended rectilinearly and parallel in alinement with the arms 20 before mentioned, and for a distance which may be less than the length of the arms 20 or otherwise, as discretion may dictate. In the present instance, the last named parallel inner arms 22 and 22' are approximately the same length as the arms 20. The length of the arms 22 and 22' as well as the length of the arms 20 must be slightly greater than the extent of reciprocating movement of the choker, which will be presently described. The extremities of the arms 22 and 22' have secured thereto the ends of respective contractile, helical springs 23, which are extended longitudinally to the end of the board 19, and there anchored by suitable pins or nails 24.

In order to support the choker slidably in a central position between the base and cover boards 10 and 13 when in closed position, eye-bolts 25 are fixed in the board 10, one of these being between the opening 17 and the near end of the board, and close beside the opening, so as to receive therethrough slidably one of the arms 20, the other eye-bolt being in longitudinal alignment with the first on the board 10, and located closely adjacent the end of the respective arm 22 when the trap is in set position. It will be seen from the foregoing that only one side of the choker is held in the eye-bolts, which are adapted to insure its proper rectilinear longitudinal movement, while the opposite side of the choker is free for lateral flexure, for purposes which will appear. In order to support the opposite side of the choker, the guide-blocks 26 are mounted on the board 10 and on the cover board 13, so as to engage those arms 20 and 22' which are not engaged in the eye-bolts, when the trap case is closed, so that the adjacent side of the choker is supported midway between the boards 10 and 13, free for longitudinal reciprocal movement, as well as lateral play. Fixed on the laterally movable arm 22' close to the respective semi-loop 21, there is a trip or detent device 27, which may consist of a tooth, prong or other projection extending inwardly from the arm 22' toward the opposite arm 22, and fixed in the board 10 so as to lie closely beside the arm 22' and to be engaged by the trip device 27 when the choker is set, there is a stop member 28. The trip device so engages the stop member 28 as to hold the choker in set position, as shown in Figure 1, until the adjacent side of the choker is sprung laterally upward and away from the opposite side of the choker until the trip device 27 clears the stop member 28, whereupon the springs 23 will rapidly and forcibly draw the choker longitudinally to the position approximately indicated in Figure 2, or further.

In the use of this trap, the choker is set by opening the boards 10 and 13 to the position shown in Figure 1, and by pressing the thumb against the side or sides of one or both of the semi-circular portions 21 furthest from the spring 23, and applying the forefinger and second finger to the end of the board 10, the choker may be drawn longitudinally toward the outer end of the board, against the tension of the springs 23, until the detent device 27 passes the stop member 28, as may be understood. By forming a sloping side on the trip in the direction of setting movement, the trip will wipe against the stop member 28, and automatically spring back to engaged position, as shown in Figure 1, after the trip has passed the stop member 28 in the setting operation described. The trip device having been set as described, the cover board 13 is now moved pivotally over the board 10, and the hooks 15 secured upon the pins 16, so as to hold the trap case closed.

The trap is now ready for placement, which is effected by setting it upon one end edge, with the choker in a vertical plane, and either the board 10 or cover 13 is disposed closely against the base-board or other surface through which a rat hole has been made, with the openings 17 and 18 as nearly as possible alined with such rat hole. Or, the device may be laid upon the ground over the opening to a burrow with the openings 17 and 18 alined with such entrance to the burrow.

It is not necessary to bait the trap, but if desired, to hasten movement of animals and trapping of the same, bait may be placed within and without the openings 17 and 18 of the trap, as discretion may indicate to be desirable.

The trap is preferably made with openings of sizes appropriate to the burrows or passages through which the animals to be trapped are expected to pass, and proportioned to the size of the animal to be trapped, so that while such animal may project its head through the loop portions 21, its shoulders will engage the same so that if the animal forces its way against the choker, the latter will be slightly opened, sufficiently to clear the detent device 27 from the stop member 28.

When an animal so engages the trap, the moment the detent device 27 clears the stop member 28, the springs 23 will draw the choker longitudinally of the trap, and clamp the animal by the neck, between one side of the loop portion 21 and the openings 17 and 18 of the base 10 and cover 13. The effect is to choke the animal to death quickly.

While I have described my invention with great particularity, and in the best forms of its embodiment known to me, it will nevertheless, be understood that this is purely exemplary, and that modifications in the constructions, arrangements and combination of parts, substitution of materials and substitution of equivalents may be made without departing from the spirit of the invention, except as more particularly set forth in the appended claims.

I claim:

1. A trap of the character described comprising a case consisting of base and cover boards hingedly connected for movement to and from close parallel relation, means to hold the base and cover boards in operative spaced relation, said cover board and base board having alined openings adapted to receive therethrough the major portions of the body of an animal to be trapped, a choker device formed of resilient wire including oppositely movable loop portions adapted to be arranged concentrically with said openings, said loop portions forming a passage of smaller diameter than the alined openings, means to support the choker device for longitudinal reciprocation between the base and cover boards, one of said loop portions at least having a detent device thereon, a stop member fixed on the base board in the path of the detent device, to engage the latter when the loop is in operative position, and resilient means engaged with the choker device tending to move it to the choking position against the opposition of said stop member and detent device when they are in engaged position.

2. A trap of the character described comprising a case consisting of base and cover boards hingedly connected for movement to and from close parallel relation, said base and cover boards having passage openings therethrough, a choker device reciprocable within the case, said choker device consisting of a piece of resilient wire bent at its middle to form parallel arms, and then bent outwardly in opposite directions to form semi-circular loops, and then extended in parallel relation in alignment with the first named arms to form respective guiding and setting arms, guide means engaged with one of the first and second named arms at the side opposite the one named as the setting arm, a trip device on the setting arm, a stop member in the base board in the path of said trip device, and spring devices engaged with the choker device constructed to move it from set position to released position, and guide means engaged with the choker device opposite the guide means of one of the first named arms, constructed and arranged to support the adjacent side of the choker device, for longitudinal reciprocation and lateral movement in the plane of the loop, for the purposes described.

WILLIAM E. PETTY.